US007636316B2

(12) United States Patent
Harhira et al.

(10) Patent No.: US 7,636,316 B2
(45) Date of Patent: Dec. 22, 2009

(54) RESOURCE ALLOCATION PLAN IN A NETWORK

(75) Inventors: Hichem Ayed Harhira, Montreal (CA); Yves Lemieux, Kirkland (CA)

(73) Assignee: Telefon Aktiebolaget LM Ericsson (Publ), Stockholm (SE)

( * ) Notice: Subject to any disclaimer, the term of this patent is extended or adjusted under 35 U.S.C. 154(b) by 226 days.

(21) Appl. No.: 11/963,941

(22) Filed: Dec. 24, 2007

(65) Prior Publication Data

US 2009/0161541 A1    Jun. 25, 2009

(51) Int. Cl.
    H04L 12/28    (2006.01)
(52) U.S. Cl. .................. 370/238; 370/254; 370/468
(58) Field of Classification Search .................. None
    See application file for complete search history.

(56) References Cited

U.S. PATENT DOCUMENTS

2004/0136324 A1* 7/2004 Steinberg et al. ............ 370/238

FOREIGN PATENT DOCUMENTS

| WO | 02/09358 A2 | 1/2002 |
| WO | 03/084152 A1 | 10/2003 |
| WO | 2006/093350 A1 | 9/2006 |

OTHER PUBLICATIONS

Xiaojun Lin et al., An optimization-based approach for QoS routing in high-bandwidth networks, IEEE/ACM Transactions on Networking, vol. 14, No. 6, Dec. 2006.

PCT Search Report from corresponding application PCT/IB2008/054746.
R. Braden et al., Integrated Services in the Internet Architecture: an Overview, Network Working Group, RFC 1633, Jun. 1994.
E. Rosen et al., Multiprotocol Label Switching Architecture, Network Working Group, RFC 3031, Jan. 2001.
Bernardo A. Movsichoff et al., Decentralized Optimal Traffic Engineering in Connectionless Networks, IEEE Journal on Selected Areas in Communications, 2005.
Panos Trimintzios et al., A Management and Control Architecture for Providing IP Differentiated Services in MPLS-Based Networks, IEEE Communications Magazine, May 2001.

(Continued)

*Primary Examiner*—Chirag G Shah
*Assistant Examiner*—Amarnauth Persaud
(74) *Attorney, Agent, or Firm*—Alex Nicolaescu; Ericsson Canada Inc.

(57) ABSTRACT

A method and Resource Allocation Manager Entity for obtaining an improved resource allocation plan for the network. Traffic requests currently exist in a network, each of which having a source, a destination and at least one Quality of Service (QoS) requirement being represented by a QoS value. For each traffic request, at least one potential path consisting of a plurality of links is computed. An iteration matrix is generated having the potential path on first axis, the links on second axis and the QoS requirement on third axis. The iteration matrix is filled by, for each of potential path, distributing the QoS value of the QoS requirement over the links for enabling a gradient space calculation method on the iteration matrix. The gradient space calculation method is applied to the iteration matrix until an iteration marker thereof indicates that the iteration matrix contains the improved resource allocation plan.

22 Claims, 6 Drawing Sheets

OTHER PUBLICATIONS

Costas Courcoubetis et al., Application of the many sources asymptotic and effective bandwidths to traffic engineering, Telecommunication Systems 12, 1999.
Rob Kunz et al., Effective Bandwidth for Traffic Engineering, IEEE 2001.
Vasilios Pasias et al., Traffic Engineering in Multi-service Networks comparing Genetic and Simulated Annealing Optimization Techniques, IEEE 2004.
Muckai K. Girish et al., Formulation of the Traffic Engineering Problems in MPLS Based IP Networks, IEEE 2000.
Vahid Tabatabaee et al., Differentiated Traffic Engineering for Providing QoS in networks, University of Maryland Institute for Advanced Computer Studies, Jun. 2004.
Vahid Tabatabaee et al., Differentiated Traffic Engineering for Providing QoS in Networks, University of Maryland Institute for Advanced Computer Studies, Feb. 2005.

* cited by examiner

RESOURCE ALLOCATION PLAN IN A NETWORK

TECHNICAL FIELD

The present invention relates to network traffic engineering and, more specifically, to finding one good network resource allocation assignment based on a mathematically resolvable multi-factor system.

BACKGROUND

Traffic engineering mainly refers to attempts made at improving traditional best effort routing to get better performance from the network while optimizing its resource allocation. Traffic engineering may also take into account Quality of Service (QoS) requirements.

On a different front, work has been initiated to develop the necessary framework for what is sometimes referred to as Next Generation Networks (NGN). NGN provides separation of transport functions, services and applications as well as support for several access technologies with different types of services. NGN is also designed to support end to end QoS constraints. NGN aims at using packet switched technology (whereas circuit switching is still commonly used at that level).

What NGN imposes in terms of traffic engineering is to accommodate much more diverse needs and characteristics. The existing multi-constraints routing mechanism, likewise, are not able to support the expected requirements while keeping a manageable level of complexity. Furthermore, the current traffic engineering solutions are focused on admission control and initial reservation setup, which leads to long term sub-optimization of network utilization.

The present invention targets the needs for a flexible yet manageable resource allocation mechanism that takes into account longer term network resource allocation.

SUMMARY

A first aspect of the present inventions is directed to a method for obtaining an improved resource allocation plan in a network. A plurality of traffic requests currently exists in the network, each of which having a source and a destination in the network. Each traffic request is also associated to at least one Quality of Service (QoS) requirement each represented by a QoS value. The method comprises a step of computing, for each of the plurality of traffic requests, at least one potential path consisting of a plurality of links between the source and the destination thereof. The method than continues with a step of generating an iteration matrix. The iteration matrix has each of the at least one potential path on a first axis, each of the plurality of links on a second axis and each of the at least one QoS requirement on a third axis. The method follows with a step of filling the iteration matrix by, for each of the at least one potential path, distributing each of the QoS value of the at least one QoS requirement over the plurality of links for enabling a gradient space calculation method on the iteration matrix. The gradient space calculation method is applied to the iteration matrix until an iteration marker of the gradient space calculation method indicates that the iteration matrix contains the improved resource allocation plan for the network.

A second aspect of the present invention is directed to a Resource Allocation Manager Entity implemented on a hardware platform. A plurality of traffic requests currently exists in a network, each of which having a source and a destination in the network and being associated to at least one Quality of Service (QoS) requirement. Each QoS requirement is represented by a QoS value. The Resource Allocation Manager Entity comprises a Computation Module. The Computation Module computes, for each of the plurality of traffic requests, at least one potential path consisting of a plurality of links between the source and the destination thereof. The Computation Module also generates an iteration matrix having each of the at least one potential path on a first axis, each of the plurality of links on a second axis and each of the at least one QoS requirement on a third axis. The Computation Module further fills the iteration matrix by, for each of the at least one potential path, distributing each of the QoS value of the at least one QoS requirement over the plurality of links for enabling a gradient space calculation method on the iteration matrix. The gradient space calculation method is applied to the iteration matrix until an iteration marker of the gradient space calculation method indicates that the iteration matrix contains an improved resource allocation plan for the network.

BRIEF DESCRIPTION OF THE DRAWINGS

A more complete understanding of the present invention may be gained by reference to the following 'Detailed description' when taken in conjunction with the accompanying drawings wherein.

DETAILED DESCRIPTION

The present invention provides a solution to traffic engineering that takes into account longer term network resource allocation, i.e., that reconsiders traffic requests currently being handled with the purpose of improving network's utilization rather than strictly admitting new traffic requests based on current network utilization without reconsidering current assignments. A resource allocation manager entity (e.g., a resource admission control system) uses predictability of traffic aggregation (linear function or non-linear convex function) to assign paths respecting Quality of Service (QoS) requirements in a network that comprises a plurality of routers (at least two edge routers connected via at least one intermediate router). A topology of the network needs to be known to the resource allocation manager. Likewise, a traffic matrix that comprises currently handled traffic requests need to be available to the resource allocation manager. In order to obtain a solution to traffic assignment, in the best mode of the invention, at least a portion of the traffic can take advantage of statistical multiplexing, which can be described by a non-linear convex function. Still in the best mode of the invention, the portion of the traffic that can be affected using statistical multiplexing is assigned to a single class (mono-traffic class). The mono-traffic class can then receive appropriate treatment in the network taking into account statistical multiplexing potential. Furthermore, it should be added that if plural traffic types were eventually described under a common statistical multiplexing function, the present invention would be able to take advantage of such a function in a manner similar to the one described for a mono-traffic type.

Figure 1:
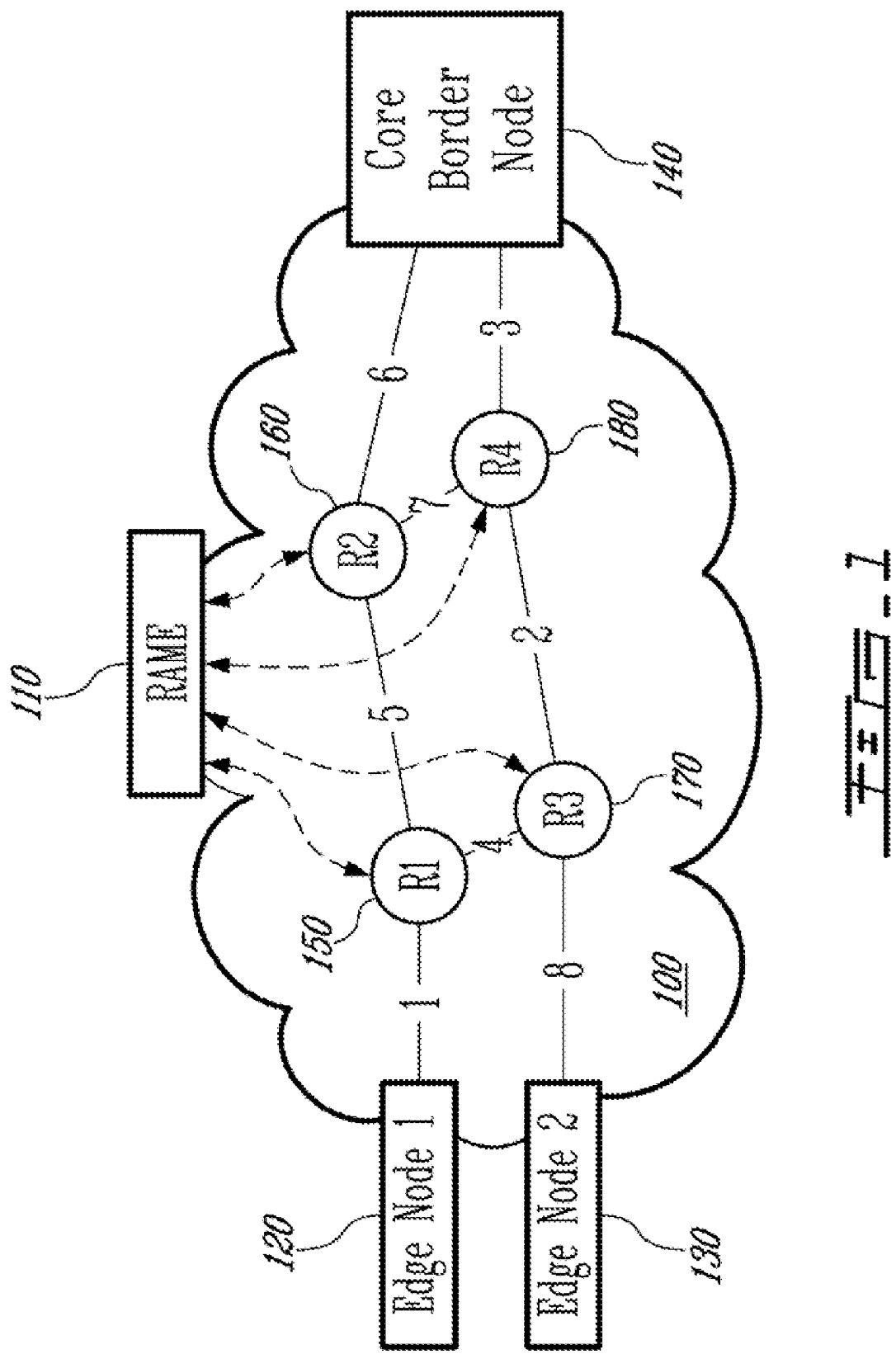
FIG. 1 is a topological view of an exemplary network in accordance with the teachings of the invention.

Reference is now made to the drawings, in which FIG. 1 shows an exemplary topological view of an exemplary network 100 in accordance with the teachings of the invention. The example of FIG. 1 is chosen with clarity and simplicity for the purpose of illustrating the present invention. Resource allocation in the network 100 is under the management of a resource allocation manager entity (RAME) 110. The RAME 110 can be implemented using software, hardware or a mix of software and hardware. Both software and hardware could be dedicated to the RAME 110, but are likely to be shared with other capabilities. For instance, the functionalities of the RAME 110 are likely to be implemented using a Resource Admission Control Subsystem (RACS), but the present invention is not limited to such an implementation. The network 100 comprises two edge nodes 120 and 130 and a core border node 140. The nodes 120, 130 and 140 represent the entry and/or exit points of the network 100. The naming of the nodes 120-140 reflects common naming used in various standards. However, the present invention shall not be construed as being limited thereto.

Some assumptions are made concerning the network 100 in order for the present invention to provide an improved, and useful, resource allocation plan. A first assumption is that there exists a mechanism for topology acquisition (or discovery) in the network 100. The present invention needs to gain knowledge of the network's 100 topology in a reasonably efficient manner, but does not have any requirements as to how such topology should be acquired. An example of acceptable topology discovery can be seen in "Topology discovery in heterogeneous networks" U.S. application Ser. No. 11/933, 692 from Yves Lemieux and Paul Vital Mahop. Furthermore, it would also be possible to simulate node removal, node addition or workload sharing in the topology of the network to better appreciate the potential effect. In a similar manner, traffic requests currently fulfilled need to be known (e.g., active path assignments, traffic matrix, etc.). The present invention may or not also consider traffic requests currently pending admission. Knowledge of such pending request is therefore desirable in the best mode of the invention yet it is not a prerequisite. Likewise, the present invention may also further consider simulated traffic requests or cancellation of existing traffic requests e.g., based on load capacity expectation, based on historical or predictable traffic peaks—daily, weekly (weekends), monthly ($1^{st}$ of the month), yearly (e.g., Christmas, Mother's day, etc.) or from punctual event (sport (e.g., Olympic games), religious, political, etc.), etc.

The present invention aims at providing an improved resource allocation plan for the network 100. The improved resource allocation plan, in itself, is a tangible result that provides, for instance, administrators of the network 100 with a view of the capabilities thereof (based on simulated addition or cancellation of traffic requests and/or simulated topology modification). The improved resource allocation plan itself can also be compared to a current resource allocation situation in order, for instance, to take a decision on whether the improved one should be propagated in the network 100 (e.g., based on the extent of the improvement). The improved resource allocation plan can be used, worked on and/or stored on any kind of digital media (computer RAM or ROM, disk RAM or ROM, USB key, etc.). While the propagation of the improved resource allocation plan in the network 100 is not core to the invention, the potential of the invention is better observed by propagating the improved resource allocation plan therein and, therefore, by using an efficient propagation mechanism in the network 100. For instance, Resource Reservation Protocol (RSVP) or similar could be used for propagating the improved resource allocation plan.

FIG. 1 further shows intermediates routers R1 150, R2 160, R3 170 and R4 180 in the network 100. The intermediate routers 160-180 are connected via links 1-8 thereby enabling traffic to be exchanged between the two edge nodes 120 and 130 and the border core node 140.

In the context of the example of FIG. 1 and for illustrating the invention, an example with two traffic requests will be taken. A first request is for transiting 1000 voice-only traffic connections from edge node 1 120 to core border node 140. The first request has a first QoS requirement of maximum delay of 21 ms and a second QoS requirement of minimum bandwidth of 100 Mbps. A second request is for transiting 500 voice-only traffic connections from edge node 2 130 to core border node 140. The second request has a first QoS requirement of maximum delay of 21 ms and a second QoS requirement of minimum bandwidth of 60 Mbps. It is assumed that the transit on each link brings about a same delay of 5 ms. This assumption is deemed reasonable in the context of a core network, which makes it easy to determine that only the paths between the entry and exit nodes 120-140 having a maximum of 4 links (3 traversed routers) are to be considered. It should be noted that describing the delay in terms of links used instead of number of traversed routers is chosen for simplicity, but does not affect the teachings of the invention. One way or the other provides a way of limiting the length of the path to be used based on maximum QoS delay (in terms of hops or links). It should further be noted that any manner by which delay requirement is considered would be good in the context of the present invention (e.g., delay measurement, information contained in topology, etc.). Of course, delay may not be a requirement at all in certain cases.

Figure 4:
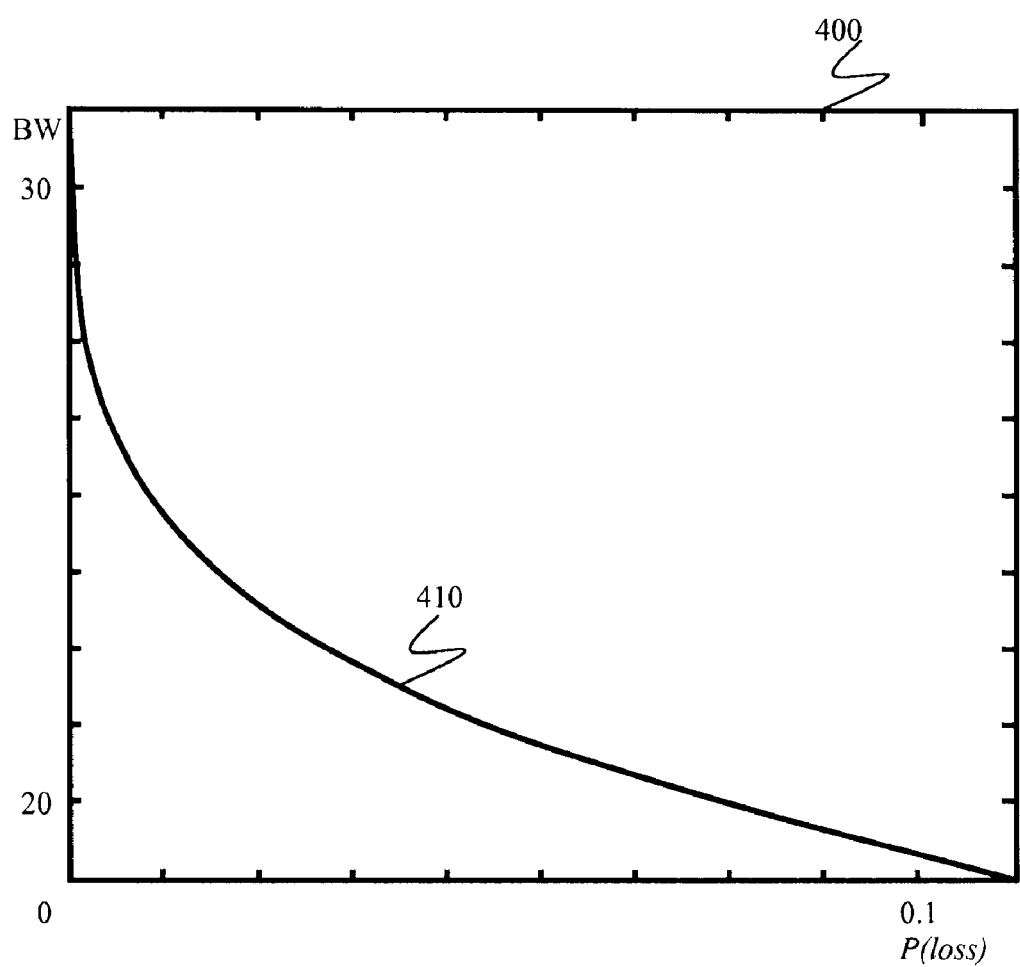
FIG. 4 shows an exemplary function between required bandwidth for 20 ON-OFF voice connections and packet loss probability in accordance with the teachings of the invention.

Another assumption made in the context of the example of FIG. 1 is that there exists a function that provides, for a required bandwidth, the maximum tolerated packet loss (%). Such a function is used to provide an improved resource allocation plan based on packet loss rather than directly on bandwidth required. FIG. 4 is a graph 400 showing an exemplary function 410 between required bandwidth for 20 ON-OFF voice connections and packet loss probability in accordance with the teachings of the invention.

The graph 400 shows an example of the total required bandwidth for 20 ON-OFF voice connections with respect to the packet loss probability. The function 410 showed further takes into account a statistical multiplexing function that is applicable to voice traffic connections. It is however important to note that the example taken in the context of FIG. 1 to illustrate the present invention does not depend on the nature of the function 410. It assumes that a function exist between the bandwidth and the packet loss (that may involve statistical multiplexing or not) and that they are continuous and convex (including simply linear, which is the simplest continuous and convex function). Notwithstanding the exemplary graph 400 of FIG. 4, and for the purpose of the present example, a bandwidth of 100 Mbps is assumed to be translated into a maximum packet loss of 12‰ and a bandwidth of 60 Mbps is assumed to be translated into a maximum packet loss of 24‰.

An iteration matrix (follows) is built based on the foregoing. It lists the potential paths for each request on the first axis and the links potentially used by such paths on the second axis. Since only a single QoS requirement of bandwidth translated in packet loss probability is used, a third axis showing the different QoS requirements is not necessary, but could be used in certain other applications. The iteration matrix will be fed to a gradient space calculation method that will iteratively get closer to an improved resource allocation plan (contained in the iteration matrix itself). It should be noted that the iteration matrix needs to contain, from the starting point, a solution that is mathematically valid in order for the gradient space calculation method to converge to a valid solution. The values that are inputted in the iteration matrix to start processing represent the packet loss ‰. A simple way of respecting the need for a mathematically valid initial proposition is to equally distribute the requirement over the number of links to be used as shown in the first matrix below (again, changing the links used for intermediate routers traversed does not affect the logic of the invention).

|          | 1 | 2 | 3 | 4 | 5 | 6 | 7 | 8 |
|----------|---|---|---|---|---|---|---|---|
| 120-140a | 4 |   |   |   | 4 | 4 |   |   |
| 120-140b | 3 |   | 3 |   | 3 |   | 3 |   |
| 120-140c | 3 | 3 | 3 | 3 |   |   |   |   |
| 130-140a |   | 8 | 8 |   |   |   |   | 8 |
| 130-140b |   | 6 |   |   |   | 6 | 6 | 6 |
| 130-140c |   |   |   |   | 6 | 6 | 6 | 6 |

Initial situation: delay max of 21 ms for both requests delay per hop of 5 ms
voice traffic in both requests 100 Mbps for 120-140; 60 Mbps for 130-140

The matrix above is thus fed in to the gradient space calculation method, which provides, for example after 100 iterations, the following iteration matrix from which improper solutions are marked as such (or removed). There exists a marker of iteration completion in the gradient space calculation method as Lagrange multipliers (which are part of the logic behind the gradient space calculation method). It is known that the gradient space calculation method stops converging (i.e. no more improvement foreseen from one iteration to the next) when all the Lagrange multipliers are greater than 0.

|          | 1 | 2 | 3 | 4 | 5 | 6 | 7 | 8 |
|----------|---|---|---|---|---|---|---|---|
| 120-140a | 4 |   |   |   | 4 | 5 |   |   |
| 120-140b | 3 |   | 3 |   | 3 |   | 3 |   |
| ~~120-140c~~ | ~~3~~ | ~~4~~ | ~~5~~ | ~~2~~ |   |   |   |   |
| 130-140a |   | 6 | 6 |   |   |   |   | 8 |
| 130-140b |   | 4 |   |   |   | 7 | 7 | 6 |
| 130-140c |   |   |   |   | 6 | 5 | 7 |   |

After 100 iterations
Still at least one Lagrange multiplier < 0

As all the Lagrange multipliers are not greater than 0 after 100 iterations, the gradient space calculation method continues and provides the following iteration matrix after 500 iterations.

|          | 1 | 2 | 3 | 4 | 5 | 6 | 7 | 8 |
|----------|---|---|---|---|---|---|---|---|
| 120-140a | 4 |   |   |   | 3 | 5 |   |   |
| ~~120-140b~~ | ~~3~~ |   | ~~4~~ |   | ~~3~~ |   |   |   |
| ~~120-140c~~ | ~~3~~ | ~~4~~ | ~~5~~ | ~~2~~ |   |   |   |   |
| 130-140a |   | 6 | 7 |   |   |   |   | 8 |
| ~~130-140b~~ |   | ~~4~~ |   |   |   | ~~7~~ | ~~7~~ | ~~6~~ |
| ~~130-140c~~ |   |   |   |   | ~~6~~ | ~~5~~ | ~~7~~ | ~~6~~ |

After 500 iterations
Lagrange multiplier all > 0

Since all the Lagrange multipliers are now greater than 0, the iteration matrix comprises a solution to the proposed problem cannot be improved from one iteration to the next. The result contained in the iteration matrix, in the context of the present example, is considered as the improved resource allocation plan. It is then possible to translate the result into bandwidth requirement per link based on the packet loss probability contained in the iteration matrix using the function used previously. Furthermore, the bandwidth requirement can be translated into class assignment. The class assignments can then, if needed, be sent in the network 100 to implement the improved resource allocation plan.

Figure 2:
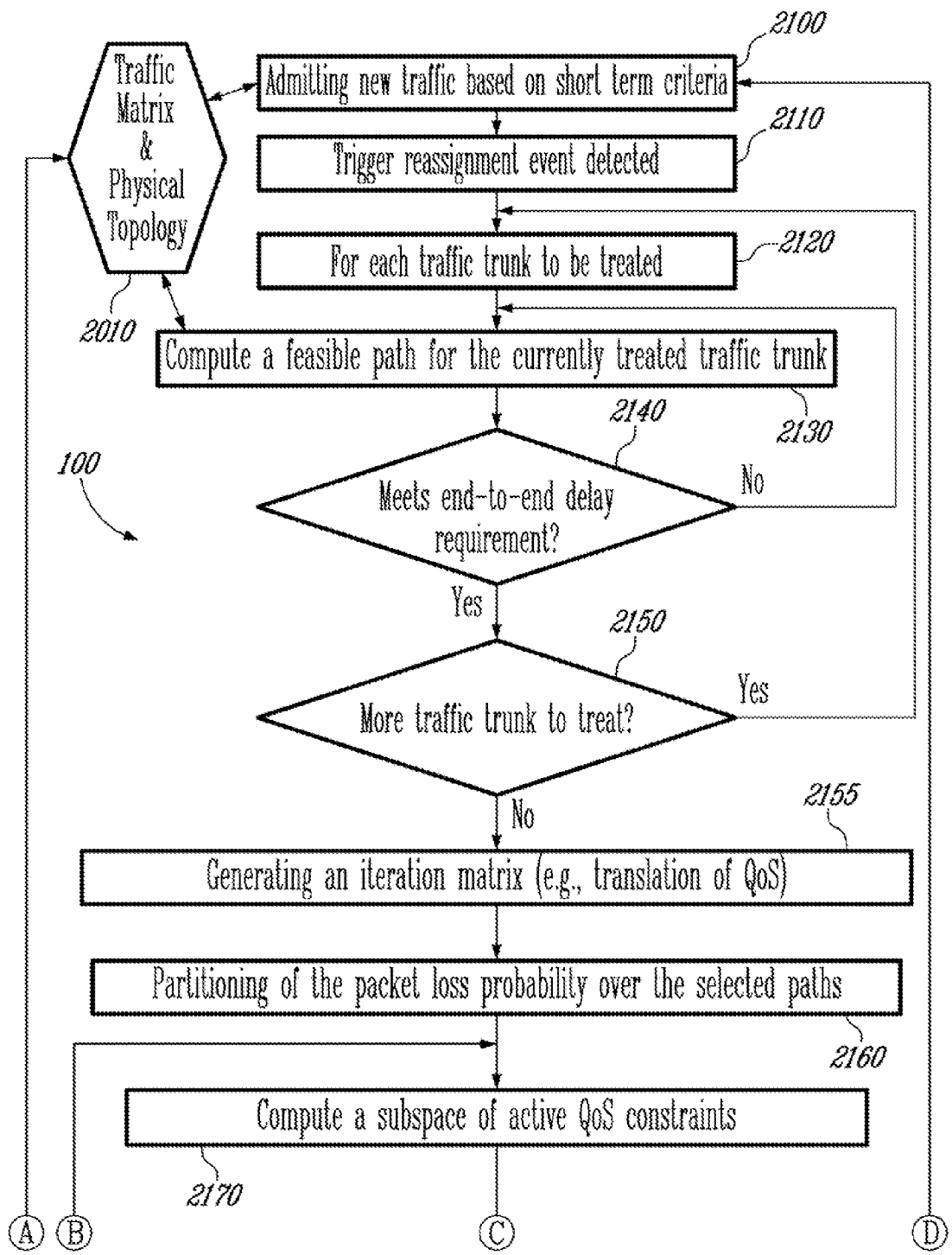
FIG. 2 shows a flow chart of an exemplary algorithm executed by a resource allocation manager in accordance with the teachings of the invention.
Figure 2:
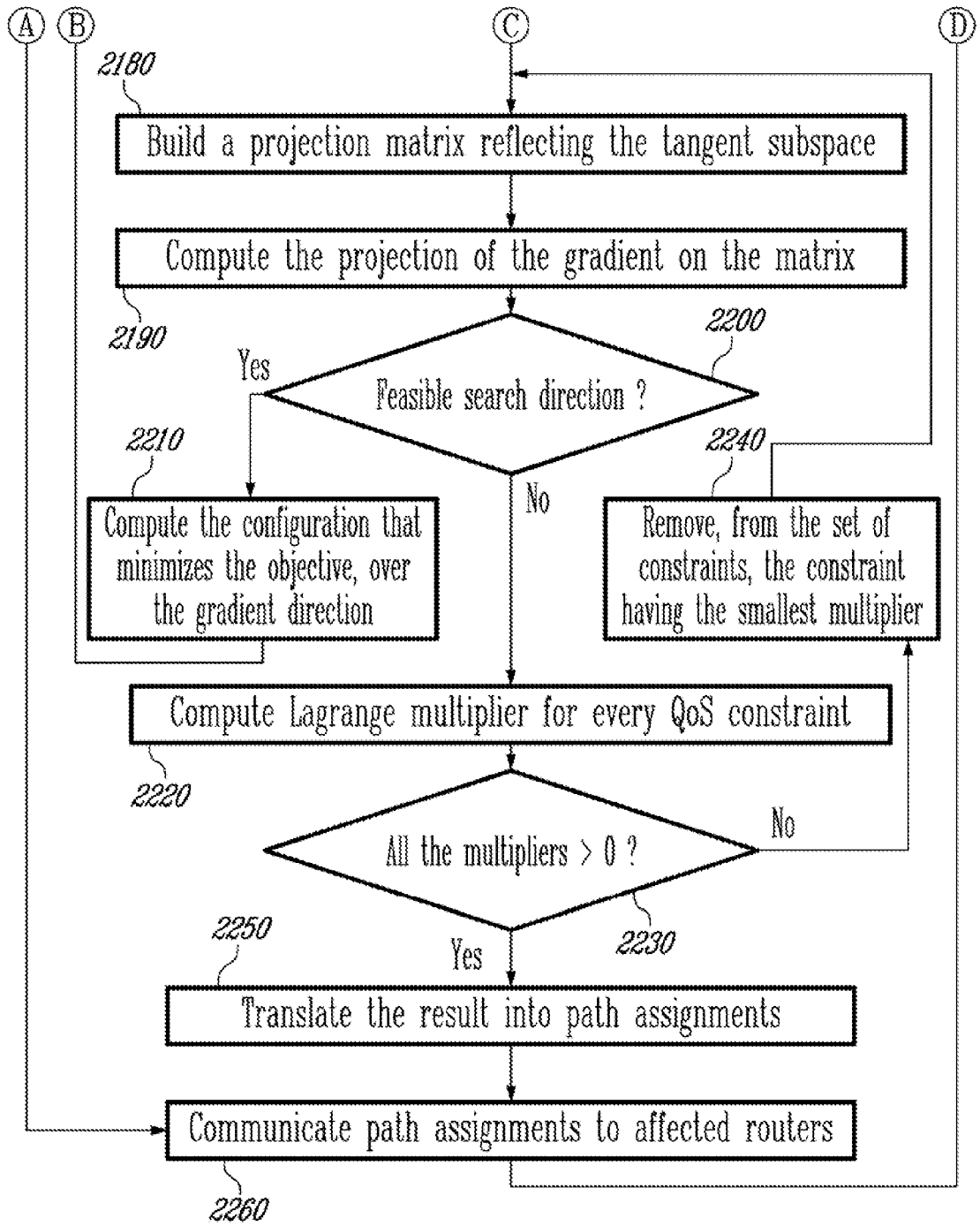

FIG. 2 shows a flow chart of an exemplary algorithm executed in the network 100, for instance, by a resource allocation manager in accordance with the teachings of the present invention.

As mentioned previously, an assumption is made that topology and current allocation be known. This is shown on FIG. 2 as contained in a Traffic Matrix & Physical Topology 2010. The Traffic Matrix & Physical Topology 2010 comprises the traffic requests being handled. The traffic requests would be aggregated based on their source and destination in the network 100, but also, in an exemplary implementation corresponding to the best mode known to the inventors, on their respective traffic types to form traffic trunks. Aggregating on traffic types enables statistical multiplexing functions to be applied to payload of certain traffic types to further enhance resource utilization. The statistical multiplexing function is evaluated over time to allow for a prediction of trunk utilization improvement as a function of the number of flows aggregated. So, to a number of aggregated flows corresponds a trunk utilization improvement in % (or in corresponding decimal fraction), which is potentially used in the present invention. It is also desirable to aggregate on QoS requirements that are common. Alternatively, it would be possible to use the most aggressive QoS requirements of a given traffic trunk for the purpose of the present invention.

The example of FIG. 2 starts with a step of admitting new traffic based on short term criteria 2100. The admission 2100 is done using the Traffic Matrix & Physical Topology 2010, among other things (e.g., credentials, etc.). However, the step 2100 alone does not consider modifications to current resource allocations handled in the network 100.

Then, a trigger reassignment event is detected 2110. The trigger event 2110 causes a reevaluation of the current traffic allocations (and potentially new traffic requests pending). The trigger event 2110 can be of various nature such as expiration of a timer (run reassignment every 2 hours), incapacity to admit a new traffic request in the network 100, change of QoS requirement for one traffic request, degradation of perceived QoS in the network 100, loss of equipment in the network 100, etc. As such, the trigger event 2110 falls outside the scope of the present invention.

Following the trigger detection 2110, each traffic trunk is treated (2120) to compute at least one feasible path for the currently treated traffic trunk (2130). The feasible path meets the source and destination requirement of the traffic trunk being treated. However, the feasible path is kept as a potential path for further analysis, in the example of FIG. 2, only if it meets the delay requirement associated thereto (2140). A simple manner of evaluating the delay of a path is to count the number of hops and use a same value of delay per hop. Such an assumption is usually made in the context of core networks. Of course, many different ways of evaluating delay requirement fulfillment can be used in the context of the present invention.

The steps 2120-2140 are repeated until there is no more traffic trunk to treat (2150). It should be noted that, in some implementations, only a subset of the traffic trunks or traffic requests handled in the network 100 could be submitted to the present algorithm. In such situations, the important aspect is that remaining capacity available to the traffic requests/trunks treated by the present algorithm be known in the topology 2010.

Once all potential paths are identified, the algorithm follows with generation of an iteration matrix 2155 to be used by a gradient space calculation method in order to obtain an improved resource allocation plan in the work 100. The iteration matrix has the potential paths on a first axis, each of the plurality of links of each potential path on a second axis and each QoS requirement on a third axis. In the example of FIG. 2, we consider a bandwidth requirement at this point that is translated in step 2155, and as explained earlier, to packet loss probability.

The iteration matrix is then filled by, for each potential path, distributing each of the packet loss probability over the plurality of links (2160). The step of distributing, in the case of packet loss, corresponds to partitioning, which needs to enable the gradient space calculation method on the iteration matrix (i.e., a mathematically acceptable solution needs to be entered in the iteration matrix). A function could be used to generate the step of distributing (a less efficient algorithm, a first run (complete or partial) of the present algorithm, etc.). The gradient space calculation method is then applied to the iteration matrix (as explicated below in steps 2170-2240). While the present invention uses the gradient space calculation method without modifying its behavior, some information on the data treatment itself is hereby provided below. It should however be noted that, in order to obtain the result of an improved resource allocation plan for the network 100, knowing that the gradient space calculation method provides a solution and applying as prescribed herein is sufficient.

The gradient space calculation method starts by computing a subspace that is composed, in the present example, of active QoS constraints 2170. It then builds a projection matrix reflecting the tangent subspace 2180. The gradient space calculation method further computes the projection of the gradient on the iteration matrix 2190. At this stage, the gradient space calculation method should have taken advantage of an eventual statistical multiplexing advantage provided by the mono-traffic type traffic trunk. The statistical multiplexing advantage is likely to be described by a function, but could also be described by a table of values with equal advantages to the present invention. If a feasible search direction exists in the gradient space (2200), the configuration that minimizes the objective, over the gradient direction is computed 2210. Otherwise, the gradient space calculation method computes Lagrange multiplier for every QoS constraint 2220. The Lagrange multipliers are an iteration marker of the iteration matrix. If all the Lagrange multipliers are greater than 0 (2230), it indicates that the iteration matrix contains the improved resource allocation plan for the network of the gradient space calculation method. If at least one of the Lagrange multipliers is below 0, then further improvement can be made and the gradient space calculation method follows with removal, from the set of constraints, the constraint having the smallest multiplier 2240.

Once the iteration matrix contains the improved resource allocation plan for the network from the gradient space calculation method, the content thereof may be used for all good reasons previously detailed. One such use is for path assignment, in which case the content of the iteration matrix (a.k.a. the result) is translated into path assignments 2250, which can be communicated to affected routers 2260 in the network 100. The decision to communicate (or propagate) path assignments is contextual (as explained hereinabove). If ever sent, the affected routers may further take a decision locally concerning application of the path assignments (e.g., policy-based decision based on identity of sender).

Figure 3A:
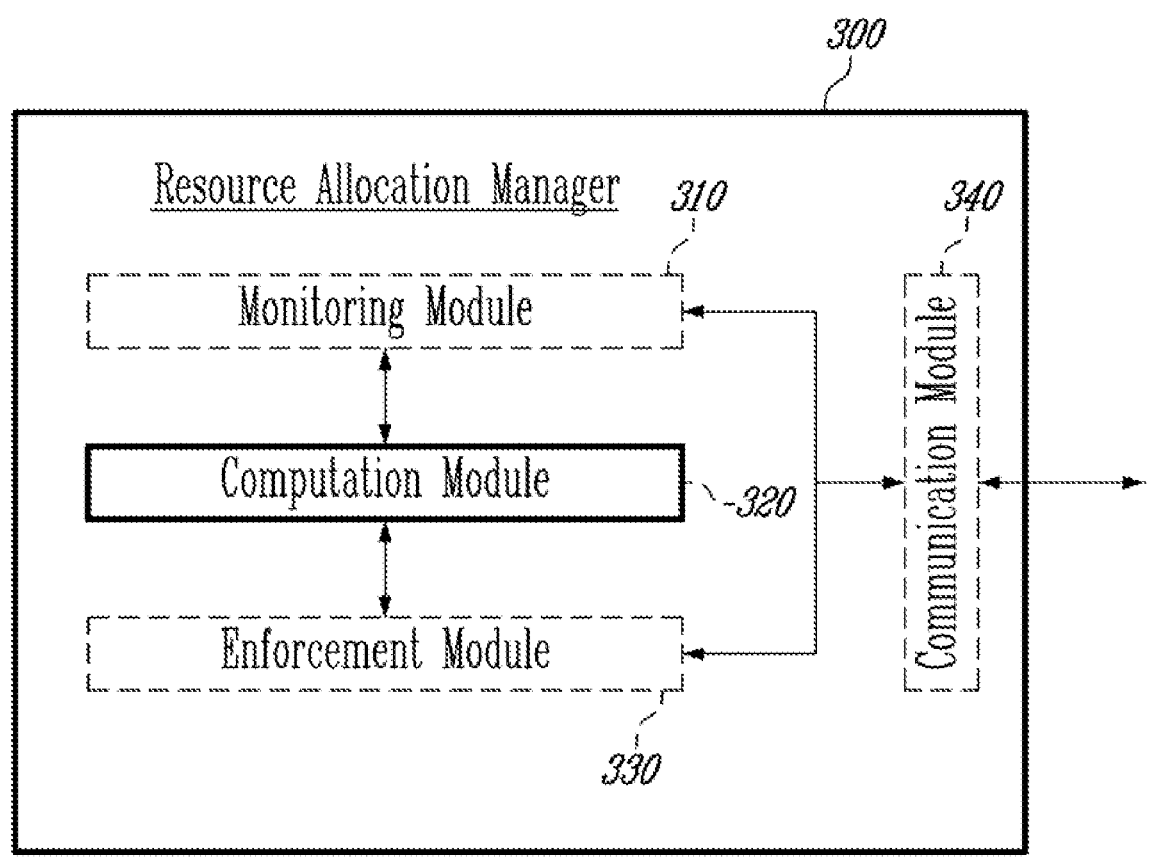
FIGS. 3A and 3B together referred to as FIG. 3 shows an exemplary modular representation of a resource allocation manager entity in accordance with the teachings of the invention.
Figure 3B:
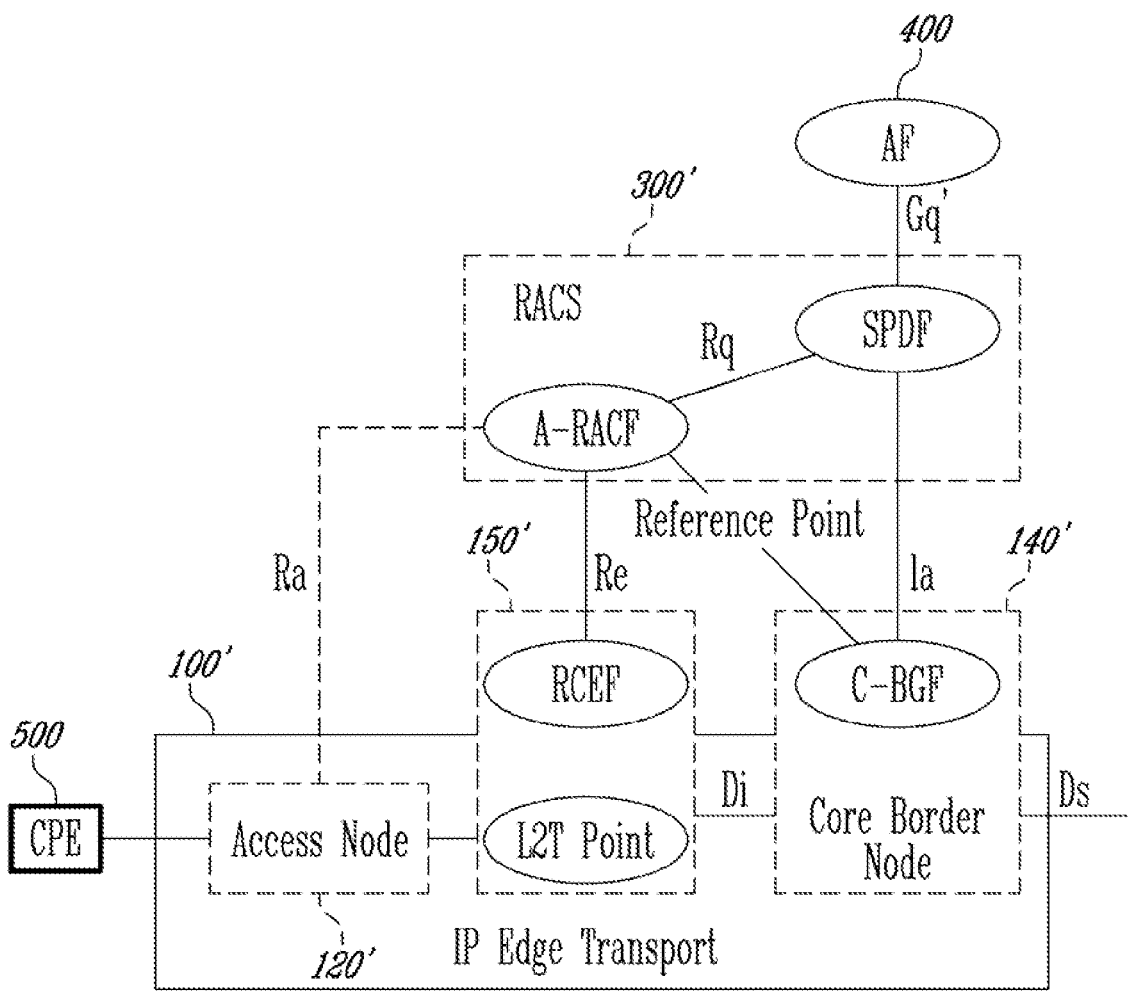

FIGS. 3A and 3B together referred to as FIG. 3 shows an exemplary modular representation of a Resource Allocation Manager Entity (RAME) 300 in accordance with the teachings of the invention. The RAME 300 may be implemented on a hardware platform in the network 100 or in another location from which the network 100 can be managed. A plurality of traffic requests currently exists in the network and each of the plurality of traffic requests has a source and a destination in the network. Each traffic request is also associated to at least one Quality of Service (QoS) requirement each represented by a QoS value. The RAME 300 comprises a Computation Module 320 that computes, for each of the plurality of traffic requests, at least one potential path consisting of a plurality of links between the source and the destination thereof. The Computation Module 320 generates an iteration matrix having each of the at least one potential path on a first axis, each of the plurality of links on a second axis and each of the at least one QoS requirement on a third axis. The Computation Module 320 also fills the iteration matrix by, for each of the at least one potential path, distributing each of the QoS value of the at least one QoS requirement over the plurality of links for enabling a gradient space calculation method on the iteration matrix. The gradient space calculation method is applied to the iteration matrix until an iteration marker of the gradient space calculation method indicates that the iteration matrix contains an improved resource allocation plan for the network.

The at least one QoS requirement may be a delay requirement for which the QoS value is a maximum delay value. Each of the plurality of links may be presumed to bring upon a same delay. In such a case, the Computation Module 320 further computes the potential path by computing, for each of the plurality of traffic requests, at least one potential path between the source and the destination, wherein each of the at least one potential path consists of a limited number of links corresponding to the maximum delay value.

The Computation Module 320 of the RAME 300 may further fill the iteration matrix by further dividing each of the QoS value equally over the plurality of links. If the at least one QoS requirement comprises a bandwidth requirement for which the QoS value is a minimum bandwidth value and if a function exists to represent the bandwidth requirement in terms of a packet loss probability, then the Computation Module 320 may further fill the iteration matrix by further performing the distribution through partitioning the packet loss probability equally over the plurality of links At least one or more of the traffic requests may further be associated to a single traffic type for which a statistical multiplexing enhancement function exists. Then, the gradient space calculation method may be performed taking into account the statistical multiplexing enhancement function.

The RAME 300 may further comprise an Enforcement Module 330 that, following indication that the iteration matrix contains the improved resource allocation plan for the network, translates the iteration matrix into a plurality of path assignments. Each path assignment could comprise a plurality of class assignments for which a function exists to represent each QoS value of the at least one QoS requirement in terms of class assignments. Then, the RAME 300 may also further comprise a Communication Module 340 that communicates at least a portion of the paths assignments in the network.

The Computation Module 320 may further compute potential path only following a trigger event in the network (e.g., an incapacity of the network 100 to accommodate a new traffic request therein and an expiration of a timer in the network 100). The RAME 300 may also further comprise a Monitoring Module 310 that receives an allocation plan revision request.

Reference is now made concurrently to FIG. 1 and FIG. 3B, which shows the RAME 300 in the context of a Resource Admission Control Sub-system (RACS) 300'. The RACS 300' is likely used, among others, in the context of Telecommunication and Internet converged Services and Protocols for Advanced Networking (TISPAN). References to the network 100 and nodes 120-150 presented on FIG. 1 are repeated in the context of TISPAN in FIG. 3B into network 100' and nodes 120'-150'. Interactions between the RACS 300' and an Access node 120' (similar to edge routers 120 or 130) are made via a Ra interface of TISPAN. Interactions between the RACS 300' and the intermediate router 150' (similar to intermediate routers 150-180) are made via a Re interface of TISPAN. Interactions between the RACS 300' and the Core border node 140' (similar to Core border router 140) are made via a Ia interface of TISPAN or via a Reference Point interface in the more specific context 3rd Generation Partnership Project (3GPP).

FIG. 3B further shows a Customer Premise Equipment (CPE) 500 that is the requesting entity when it comes to traffic transition in the network 100' and an Application Function (AF) 400 connected to the RACS 300' through a Gq' interface. The AF 400 is likely to be requesting revision of resource allocation plan or another trigger reassignment event, for instance, in the context of the present invention.

Although several examples of the present invention have been illustrated in the accompanying drawings and described in the foregoing description, it will be understood that the invention is not limited to the embodiments disclosed, but is capable of numerous rearrangements, modifications and substitutions without departing from the teachings of the present invention. In general, statements made in the description of the present invention do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale.

What is claimed is:

1. A method for obtaining an improved resource allocation plan in a network, wherein a plurality of traffic requests currently exists in the network, each of the plurality of traffic requests having a source and a destination in the network and being associated to at least one Quality of Service (QoS) requirement each represented by a QoS value, the method comprising the steps of:

computing, using a hardware platform, for each of the plurality of traffic requests, at least one potential path consisting of a plurality of links between the source and the destination thereof;

generating an iteration matrix having each of the at least one potential path on a first axis, each of the plurality of links on a second axis and each of the at least one QoS requirement on a third axis; and filling the iteration matrix by, for each of the at least one potential path, distributing each of the QoS value of the at least one QoS requirement over the plurality of links for enabling a gradient space calculation method on the iteration matrix, the gradient space calculation method being applied to the iteration matrix until an iteration marker of the gradient space calculation method indicates that the iteration matrix contains the improved resource allocation plan for the network, wherein the improved resource allocation plan is stored in memory.

2. The method of claim 1 wherein the at least one QoS requirement is a delay requirement for which the QoS value is a maximum delay value and each of the plurality of links is presumed to bring upon a same delay, the step of computing further comprising computing, for each of the plurality of traffic requests, at least one potential path between the source and the destination, wherein each of the at least one potential path consists of a limited number of links corresponding to the maximum delay value.

3. The method of claim 1 wherein the step of filling the iteration matrix by distributing each of the QoS value further comprises dividing each of the QoS value equally over the plurality of links.

4. The method of claim 3 wherein the at least one QoS requirement comprises a bandwidth requirement for which the QoS value is a minimum bandwidth value and wherein a function exists to represent the bandwidth requirement in terms of a packet loss probability, the step of filling the iteration matrix by distributing each of the QoS value further comprising partitioning the packet loss probability equally over the plurality of links.

5. The method of claim 1 wherein at least a first of the plurality of traffic requests is further associated to a single traffic type.

6. The method of claim 5 wherein a statistical multiplexing enhancement function exists for the single traffic type, the gradient space calculation method being performed taking into account the statistical multiplexing enhancement function.

7. The method of claim 1, following indication that the iteration matrix contains the improved resource allocation plan for the network, further comprising a step of translating the iteration matrix into a plurality of path assignments, each path assignment comprising a plurality of class assignments, wherein a function exists to represent each QoS value of the at least one QoS requirement in terms of class assignments.

8. The method of claim 7 further comprising a step of communicating at least a portion of the paths assignments in the network.

9. The method of claim 1 wherein the step of computing is performed following a trigger event in the network.

10. The method of claim 9 wherein the trigger event in the network comprises one of an incapacity of the network 100 to accommodate a new traffic request therein and an expiration of a timer in the network 100.

11. The method of claim 1 further comprising a first step receiving an allocation plan revision request prior to the step of computing.

12. A Resource Allocation Manager Entity implemented on a hardware platform, wherein a plurality of traffic requests currently exists in a network, each of the plurality of traffic requests having a source and a destination in the network and being associated to at least one Quality of Service (QoS) requirement each represented by a QoS value, the Resource Allocation Manager Entity comprising:

a Computation Module that:

computes, for each of the plurality of traffic requests, at least one potential path consisting of a plurality of links between the source and the destination thereof, generates an iteration matrix having each of the at least one potential path on a first axis, each of the plurality of links on a second axis and each of the at least one QoS requirement on a third axis; and fills the iteration matrix by, for each of the at least one potential path, distributing each of the QoS value of the at least one QoS requirement over the plurality of links for enabling a gradient space calculation method on the iteration matrix, the gradient space calculation method being applied to the iteration matrix until an iteration marker of the gradient space calculation method indicates that the iteration matrix contains an improved resource allocation plan for the network.

13. The Resource Allocation Manager Entity of claim 12 wherein the at least one QoS requirement is a delay requirement for which the QoS value is a maximum delay value and each of the plurality of links is presumed to bring upon a same delay, wherein the Computation Module further computes by computing, for each of the plurality of traffic requests, at least one potential path between the source and the destination, wherein each of the at least one potential path consists of a limited number of links corresponding to the maximum delay value.

14. The Resource Allocation Manager Entity claim 12 wherein the Computation Module further fills the iteration matrix by further dividing each of the QoS value equally over the plurality of links.

15. The Resource Allocation Manager Entity of claim 14 wherein the at least one QoS requirement comprises a bandwidth requirement for which the QoS value is a minimum bandwidth value and wherein a function exists to represent the bandwidth requirement in terms of a packet loss probability, wherein the Computation Module fills the iteration matrix by further distributing the packet loss probability equally over the plurality of links.

16. The Resource Allocation Manager Entity of claim 12 wherein at least a first of the plurality of traffic requests is further associated to a single traffic type.

17. The Resource Allocation Manager Entity claim 16 wherein a statistical multiplexing enhancement function exists for the single traffic type, the gradient space calculation method being performed taking into account the statistical multiplexing enhancement function.

18. The Resource Allocation Manager Entity claim 12, following indication that the iteration matrix contains the improved resource allocation plan for the network, further comprising an Enforcement Module that translates the iteration matrix into a plurality of path assignments, each path assignment comprising a plurality of class assignments, wherein a function exists to represent each QoS value of the at least one QoS requirement in terms of class assignments.

19. The Resource Allocation Manager Entity claim 18 further comprising a Communication Module that communicates at least a portion of the paths assignments in the network.

20. The Resource Allocation Manager Entity claim 12 wherein the Computation Module computes following a trigger event in the network.

21. The Resource Allocation Manager Entity claim 20 wherein the trigger event in the network comprises one of an incapacity of the network 100 to accommodate a new traffic request therein and an expiration of a timer in the network 100.

22. The Resource Allocation Manager Entity claim 12 further comprising a Monitoring Module that receives an allocation plan revision request.

* * * * *

UNITED STATES PATENT AND TRADEMARK OFFICE
CERTIFICATE OF CORRECTION

| | |
|---|---|
| PATENT NO. | : 7,636,316 B2 |
| APPLICATION NO. | : 11/963941 |
| DATED | : December 22, 2009 |
| INVENTOR(S) | : Harhira et al. |

Page 1 of 1

It is certified that error appears in the above-identified patent and that said Letters Patent is hereby corrected as shown below:

On the Title Page, in Item (73), under "Assignee", in Column 1, Line 1, delete "Telefon Aktiebolaget" and insert -- Telefonaktiebolaget --, therefor.

In Column 8, Line 54, delete "links" and insert -- links. --, therefor.

In Column 10, Line 67, in Claim 12, delete "thereof," and insert -- thereof; --, therefor.

Signed and Sealed this

Sixteenth Day of March, 2010

David J. Kappos
*Director of the United States Patent and Trademark Office*